(12) United States Patent
Wach

(10) Patent No.: US 10,137,379 B2
(45) Date of Patent: Nov. 27, 2018

(54) SIX DEGREE OF FREEDOM (DOF) MOTION PLATFORM WITHOUT NON-REDUNDANT LOAD PATHS

(71) Applicant: DISNEY ENTERPRISES, INC., Burbank, CA (US)

(72) Inventor: Ryan R. Wach, Santa Clarita, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 279 days.

(21) Appl. No.: 15/004,507

(22) Filed: Jan. 22, 2016

(65) Prior Publication Data

US 2017/0072327 A1    Mar. 16, 2017

Related U.S. Application Data

(60) Provisional application No. 62/217,211, filed on Sep. 11, 2015.

(51) Int. Cl.
| | |
|---|---|
| *A63G 31/16* | (2006.01) |
| *F16M 11/20* | (2006.01) |
| *A63G 31/02* | (2006.01) |
| *G09B 9/00* | (2006.01) |

(52) U.S. Cl.
CPC ............ *A63G 31/16* (2013.01); *A63G 31/02* (2013.01); *F16M 11/2035* (2013.01)

(58) Field of Classification Search
CPC ........ A61G 31/00; A61G 31/04; A61G 31/16; G09B 9/00; G09B 9/12; G09B 9/16; A63G 31/12

USPC .......................... 472/59–61, 130; 434/29, 55
See application file for complete search history.

(56) References Cited

U.S. PATENT DOCUMENTS

| | | | | |
|---|---|---|---|---|
| 5,605,462 A * | 2/1997 | Denne | ..................... | F15B 15/00 434/372 |
| 5,752,834 A * | 5/1998 | Ling | ........................ | G09B 9/12 434/55 |
| 5,791,903 A * | 8/1998 | Feuer | ....................... | G09B 9/14 434/30 |
| 5,857,917 A * | 1/1999 | Francis | .................. | A63G 31/16 434/55 |
| 6,634,885 B2 * | 10/2003 | Hodgetts | .................. | G09B 9/12 434/29 |

(Continued)

*Primary Examiner* — Kien Nguyen
(74) *Attorney, Agent, or Firm* — Marsh Fischmann & Breyfogle LLP; Kent A. Lembke

(57) ABSTRACT

A six degree of freedom (DOF) motion platform system is described that, in contrast to Stewart platforms, is adapted to include redundant load paths or to be without non-redundant load paths. During operation of the six DOF motion platform system, a controller may employ motion control software to provide desired movement of a ride vehicle supported on the upper plate or motion platform of the system. This makes the six DOF motion platform system particularly well suited for use in amusement or theme park rides and similar applications where it is desirable to provide redundant load paths because this reduces significant design constraints and also lowers fabrication and maintenance/operation costs when compared to rides using Stewart platforms. The actuation system used in the motion platform system include four pairs of linear actuators arranged as a rectangular truss instead of a more conventional triangular truss used in six DOF motion platforms.

10 Claims, 7 Drawing Sheets

(56) References Cited

U.S. PATENT DOCUMENTS

| | | | | |
|---|---|---|---|---|
| 7,094,157 B2* | 8/2006 | Fromyer | ............... | A63G 31/12 434/55 |
| 2014/0302462 A1* | 10/2014 | Vatcher | ................. | A63G 31/16 434/55 |

* cited by examiner

SIX DEGREE OF FREEDOM (DOF) MOTION PLATFORM WITHOUT NON-REDUNDANT LOAD PATHS

CROSS-REFERENCE TO RELATED APPLICATIONS

This application claims the benefit of U.S. Provisional Application No. 62/217,211, filed Sep. 11, 2015, which is incorporated herein by reference in its entirety.

BACKGROUND

1. Field of the Description

The present description relates, in general, to design and control of ride platforms, and, more particularly, to a six degree of freedom (DOF) motion platform for use in amusement park rides and other applications that is configured to have redundant load paths.

2. Relevant Background

It is often desirable in the design of amusement or theme park rides (and other applications) to provide a six DOF motion platform for supporting a passenger or ride vehicle. Six DOF motion refers to freedom of movement of a rigid body (e.g., the motion platform for supporting a ride vehicle (or the motion platform may be the base of the vehicle)) in three-dimensional (3D) space. The rigid body can be moved via driving or actuation of the motion platform to change position with forward/backward, up/down, and left/right translation in three perpendicular axes combined with changes in orientation through rotation about three perpendicular axes (or through pitch, yaw, and roll).

Ride designers have commonly used a Stewart platform to implement a six DOF motion platform to support and selectively move a ride vehicle. A Stewart platform is a type of parallel robot or mechanism that incorporates six linear actuators or jacks. These actuators are mounted in pairs to the mechanism's stationary support base at one end and a top plate or motion platform at a second end. Objects such as a ride vehicle placed on the top plate or motion platform can be moved in the six degrees of freedom in which it is possible for a freely-suspended body to move (i.e., three linear movements (along the X, Y, and Z axes or with lateral, longitudinal, and vertical movement) and three rotations of pitch, roll, and yaw).

In these rides or ride systems, the Stewart platform motion base is configured in a triangular, six-member truss arrangement where each member is a linear actuator. While this design allows for effective manipulation of the motion platform with six degrees of freedom, each member or component (e.g., linear actuator) in all of the six truss members is a non-redundant load path. For ride system applications, non-redundant load path components are a major safety concern. In order to maintain a safe and stable structure for riders in the vehicle on the motion platform, it is important that none of the components can fail without causing catastrophic instability to the motion platform, but this is not the case with a conventional Stewart platform motion base. For example, failure of any one of the linear actuators (or even a pin or subcomponent of the actuator) will cause the motion platform to become unstable. Due to the non-redundancy associated with use of Stewart platforms, it is necessary for the ride system to be designed with very high factors of safety for strength and fatigue. Additionally, the typical Stewart platform-base ride system is typically designed to include additional mechanical or structural components in order to maintain structural safety in the event of a truss component failure.

Another problem with the use of a triangular motion platform (three connection points between actuator pairs and motion platform form a triangle) is that the majority of ride vehicles (e.g., vehicle bodies such as a ride simulator cabin) are rectangular rather than triangular. Hence, the ride system is made more complex as use of a Stewart platform often necessitates the addition of an extra structural base to be mounted on top of the motion platform, which adds weight and complication to the ride system.

Hence, there remains a need for an improved motion platform that can provide six DOF motion and is especially well-suited for use as a motion platform for an amusement or theme park ride.

SUMMARY

Briefly, a six DOF motion platform system is described that, in contrast to a Stewart platform, is adapted to include redundant load paths or to be without non-redundant load paths. During operation of the six DOF motion platform system, a controller may employ motion control software (e.g., a ride control program executed by a processor) to provide desired movement of a ride vehicle supported on the upper plate or motion platform of the system. This makes the six DOF motion platform system particularly well suited for use in amusement or theme park rides and similar applications where it is desirable to provide redundant load paths because this reduces significant design constraints (e.g., can avoid the need for very high end, fail safe (or high factor of safety/over designed), and/or expensive parts for Stewart platform-based park rides) and also lowers fabrication and maintenance/operation costs.

More particularly, a motion platform apparatus or system is provided for supporting an object (such as a passenger vehicle in an amusement park ride) and for moving the supported object with six degree of freedom (DOF) motion. The apparatus includes a motion platform and a base with an upper surface facing and spaced apart from a lower surface of the motion platform. The apparatus also includes an actuation system coupled with the lower surface of the motion platform and with the upper surface of the base. The actuation system operates to move the motion platform with six DOF motion, and, significantly, the actuation system is free of non-redundant load paths (e.g., includes redundancy in contrast to a conventional Stewart platform-based motion system).

In some embodiments, the actuation system is pivotally coupled, via four platform coupling components, with the lower surface of the motion platform at four coupling locations that are arranged in a rectangular pattern (rather than a triangular pattern found with Stewart platform arrangement). In some cases, the platform coupling components each includes at least one U-joint.

In an exemplary implementation, the actuation system includes four actuator assemblies that are independently and concurrently operable to provide the six DOF motion. Each of the four actuator assemblies may include a pair of linear actuators, with each of the linear actuators being independently operable to extend or withdraw an actuator rod from an actuator body to move the motion platform. Each of the linear actuators typically is pivotally coupled at a first end to the upper surface of the base and at a second end to the lower surface of the motion platform. The linear actuators in each of the pairs of linear actuators are arranged in a triangular pattern. Specifically, the first ends of the linear actuators in each of the pairs of linear actuators are spaced apart a predefined distance to define a first leg of the triangular pattern and the second ends of the linear actuators in each of the pairs of linear actuators are pivotally coupled to a platform coupling component attached to the lower surface of the motion platform, whereby the linear actuators in each of the pairs of linear actuators define second and third legs of the triangular pattern. In this way, the platform coupling components define four coupling locations, and the four coupling locations are spaced apart in a rectangular pattern (e.g., are corners of a rectangle).

The motion platform systems designed by the inventor may have many uses and be implemented in a variety of ways to provide 6 DOF movement to a supported object. In some particular implementations, though, an amusement park ride may be configured to utilize this new technology. Such a ride may include a motion platform and a passenger vehicle mounted on or integrally formed with an upper surface of the motion platform. The ride would also include a base (which may be a separate component or a portion of a support structure for the ride such as a floor, platform, or the like) with an upper surface spaced apart from a lower surface of the motion platform.

The ride may further include an actuation system coupled with the lower surface of the motion platform and with the upper surface of the base. In practice, the actuation system operates to move the motion platform with six DOF motion. The actuation system is pivotally coupled with the lower surface of the motion platform at four coupling locations that are arranged in a rectangular pattern. Preferably, the actuation system is free of non-redundant load paths. The actuation system includes four actuator assemblies that are independently operable to provide the six DOF motion to the motion platform. In some embodiments, each of the four actuator assemblies includes a pair of linear actuators, and each of the linear actuators is independently operable to extend or withdraw an actuator rod from an actuator body. Further, each of the linear actuators can be pivotally coupled (such as with a U-joint) at a first end to the upper surface of the base and at a second end to the lower surface of the motion platform.

DETAILED DESCRIPTION

Figure 1:
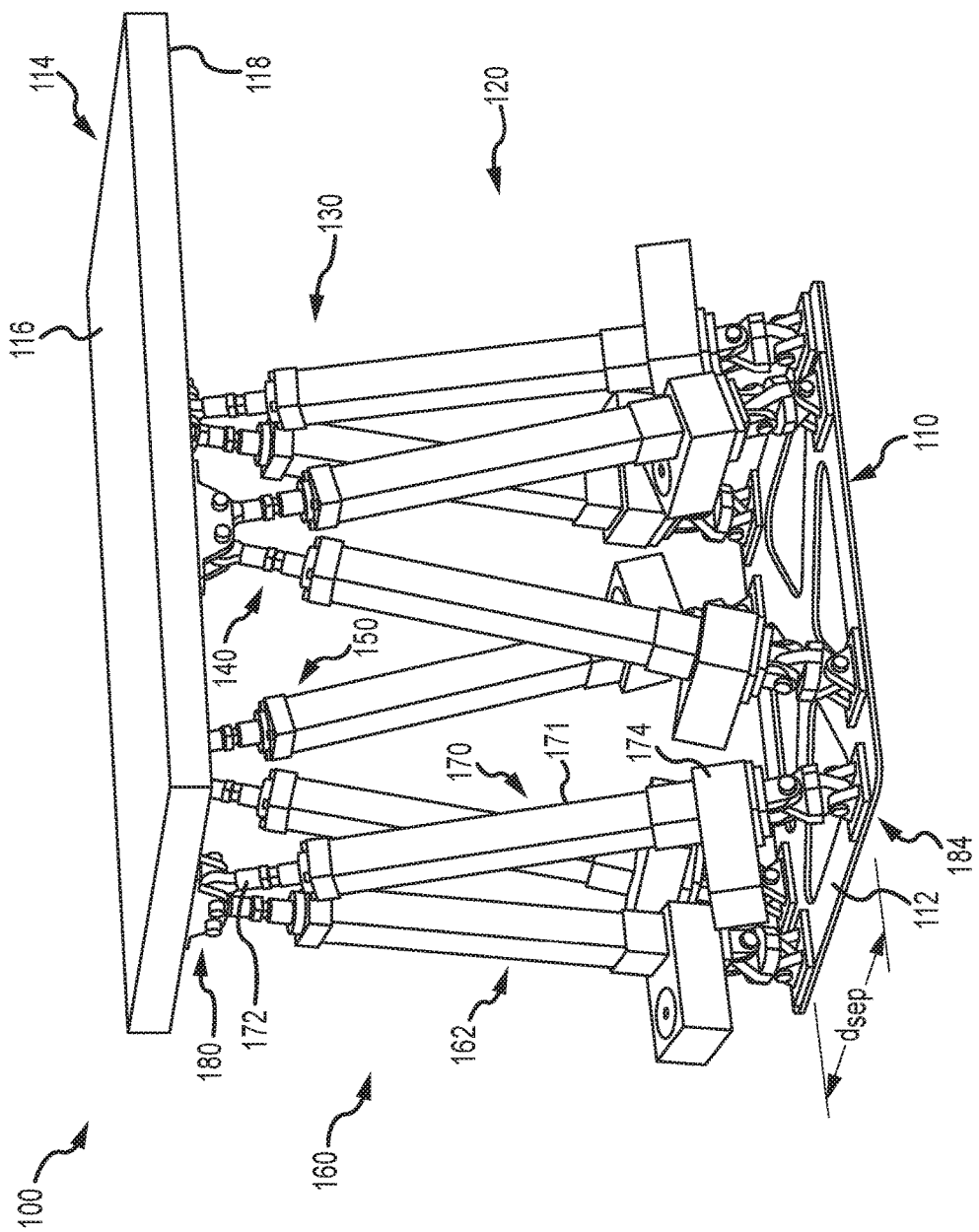
FIGS. 1 and 2 illustrate with a side perspective view and an end view, respectively, a six DOF motion platform system with eight linear actuators arranged in four operating pairs or assemblies to provide a rectangular truss configuration.

The inventor recognized that Stewart platforms are desirable for use in the design of park rides in part because movement of any one of the six linear actuators provides motion of the motion platform and a vehicle supported on the motion platform. This is possible in part because the Stewart platform is not over-constrained, and common design practices lead a ride designer to avoid over-constrained mechanisms. In contrast to these common practices or in a counterintuitive approach, the inventor recognized that it is desirable in some cases to avoid non-redundant load paths, which can be achieved by providing an over-constrained design for the six DOF motion platform system.

The motion platform or motion platform system described herein is over-constrained because it uses eight linear actuators to achieve the six degrees of freedom motion previously provided by a Stewart platform and its six actuators. As a result, the system is without non-redundant load paths as any two of the linear actuators can be lost or fail without loss of stability of the motion platform. This design is also counterintuitive to those in the industry because the controller may be required to be more complex (e.g., the ride control program may be more complex) to control the actuators in a selective and independent manner so as to avoid having the actuators working against each other (e.g., the actuators are controlled to work in a complementary manner throughout operations of the motion platform system).

As will become clear, the motion platform is desirably "rectangular" (e.g., the four connection points or locations for the four pairs of linear actuators can define a rectangle or they can be captured within a larger rectangle such as within the sides of a motion platform) rather than triangular. Such an arrangement is achievable due to the use of eight actuators arranged in four pairs such that four pivotal connections are provided on the bottom side of the motion platform or top plate. This is useful because additional structure is then not required for the motion platform to support a ride vehicle (or other object) as was the case with the conventional triangular motion platform associated with Stewart platform-based ride systems.

In the discussion and supporting figures, a six DOF motion platform system is described herein that solves problems associated with Stewart platforms by utilizing a rectangular, eight-member truss where each "member" is a linear actuator. This configuration, although over-constrained, eliminates all non-redundant load path components from the system. The over-constrained aspect does not impede proper function or limit movement, but an adequate control system (or controller) is included in the system to ensure the linear actuators do not work against each other. This system allows for up to two of the eight truss members to fail while the motion platform system still remains stable and safe. Additionally, because the truss structure is rectangular, the top plate or motion platform can be integral to the supported object (e.g., a passenger cabin, ride vehicle, or the like), which results in a simpler and lighter weight structure when compared with ride motion platforms based on conventional Stewart platforms.

Figure 2:
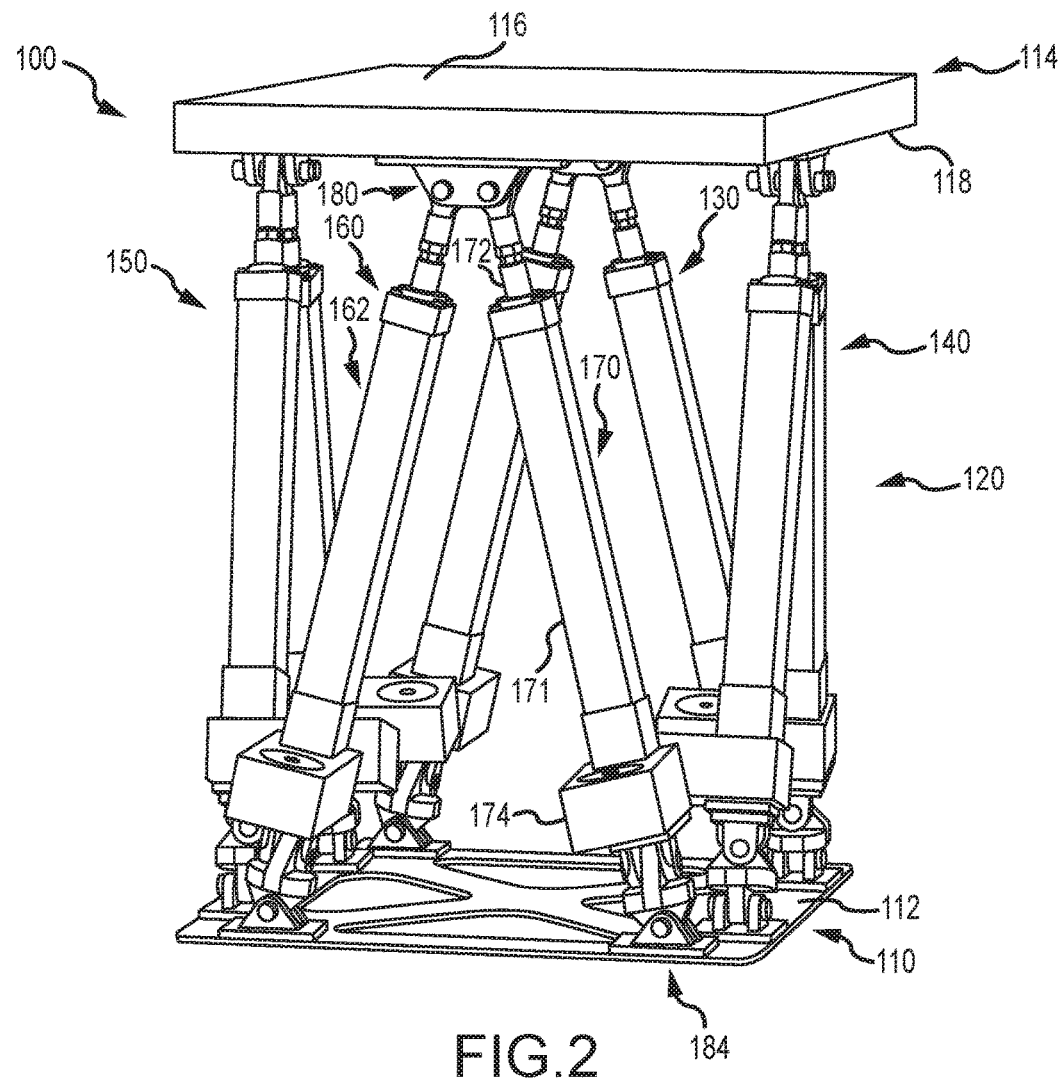

FIGS. 1 and 2 illustrate (with a side perspective view and an end view) a six DOF motion platform system 100 that may be used to support and provide motion to a passenger vehicle of a park ride or for other applications in which a Stewart platform had previously been utilized. The motion platform system 100 includes a base 110 and an upper plate or motion platform 114. An actuation system 120 is positioned between the base 110 and motion platform 114 and interconnects these two components as the actuation system 120 is coupled to an upper surface 112 of the base 110 and also to a lower or bottom surface 118 of the motion platform 114. In use, an object such as a ride vehicle (not shown but readily understood by those skilled in the arts) or the like is mounted to the upper or top surface 116 or the object's body or lower portion may be integral with the motion platform 114 (e.g., the bottom of a vehicle body may be directly coupled to the actuation system 120 as the lower or bottom surface 118 may be the lower or bottom surface of the object rather than of a separate motion platform/top plate 114).

The actuation system 120 includes four actuator assemblies 130, 140, 150, and 160, which may take a similar or, more commonly, identical form (e.g., each may include an identical pair of linear actuators with each of the eight linear actuators having the same design). Hence, the following discussion describes one representative actuator assembly (i.e., assembly 160) in more detail, and this description of assembly 160 should be understood to be applicable to the other assemblies (i.e., assemblies 130, 140, and 150).

Particularly, the actuator assembly 160 is made up of a pair of (or first and second) linear actuators 162 and 170. The actuators 162 and 170 are each mounted as shown in the system 100 with a first end pivotally coupled to the upper surface 112 of the base 110 and with a second end pivotally coupled to the lower surface 118 of the mounting platform 114. The ends of the actuators 162 and 170 attached to the upper surface 112 of the base 110 are spaced apart a predefined distance, $d_{sep}$, while the ends of the actuators 162 and 170 are coupled in a more proximate manner via a single platform coupling component 180. In this manner, the actuator assembly 160 is arranged in a triangular manner with a portion of the base 110 providing a first or base leg of the triangle having a length equal to the separation distance, $d_{sep}$, while the second and third legs of the triangle are provided by the actuator components 162, 170 (the length of these legs may be the overall length of the actuators 162, 170 including connector and drive components, which may be any state between wholly withdrawn to wholly extended).

The actuators 162 and 170 may be (and are in some preferred implementations of the system 100) identical in form so it may be useful (and adequate) to describe one of these actuators in more detail. Particularly, the actuator 170 is a linear actuator (e.g., an electric actuator, a pneumatic actuator, a hydraulic actuator, or other linear actuator). The actuator 170 includes an actuator body 171 coupled at a first or lower end to a driver (e.g., an electric motor such as a fold back or inline electric motor useful with linear actuators) 174. From a second or upper end of the body 171, an actuator rod 172 may be outwardly extended or be withdrawn (e.g., the rod 172 is supported within a channel (not shown) of the body 170 and moved within the channel in a selective manner by operation of the driver 174 such as by a controller (not shown in this figure)).

At a lower (or first) end, the actuator 170 is pivotally coupled with the upper surface 112 of the base 110 with a base coupling component 184, which may take a variety of forms such as a U-joint as shown in FIG. 1. At an upper (or second) end, the actuator 170 is pivotally coupled with the lower surface 118 of the motion platform 114 with a platform coupling component 180, which may also take a variety of forms such as a U-joint or a spherical rod end assembly as shown in FIG. 1. With this connection arrangement, the actuator 170 is able to pivot about its first end at the connection to the base 110 and also pivot about its second end at the connection to the motion platform 114 such as when the actuator 170 or any of the other actuators of the actuator assemblies or pairs 130, 140, 150, and/or 160 are operated by their associated drivers (such as driver 174 for actuator 170) to move an actuator rod (such as rod 172 for actuator 170) outward or inward from an actuator body (such as body 171 for actuator 170), e.g., move through its actuator stroke, with the size or magnitude of these strokes typically being the same for each actuator in the pairs/assemblies 130, 140, 150, and 160.

As shown in FIG. 1, the motion platform system 100 makes use of eight linear actuators arranged in four pairs (or assemblies 130, 140, 150, and 160). Four platform connection or coupling components (such as component 180) are used to couple these four pairs of actuators to the bottom or lower surface 118 of the motion platform 114 to provide four drive or connection points between the actuation system 120 and the motion platform 114 in contrast to the three connection points of a Stewart platform. The four connection points (or four coupling components) are arranged in a rectangular pattern (e.g., associated with corners or sides of a rectangle), which can be beneficial for supporting a rectangular object such as the motion platform 114.

More significantly, though, the use of eight linear actuators arranged in the actuator pairs or assemblies 130, 140, 150, and 160 allows all non-redundant load paths to be eliminated. Significantly, redundant load paths are provided as any two of the linear actuators of the pairs or assemblies 130, 140, 150, and 160 may fail without loss of stability of the motion platform 114. Further, the use of a rectangular truss or coupling pattern for the actuator pairs 130, 140, 150, and 160 still allows the motion platform 114 to be moved using six degrees of freedom motion similar to the motion provided by a Stewart platform such that the new motion platform system 100 can be used in place of Stewart platform-based motion platform devices.

Figure 3:
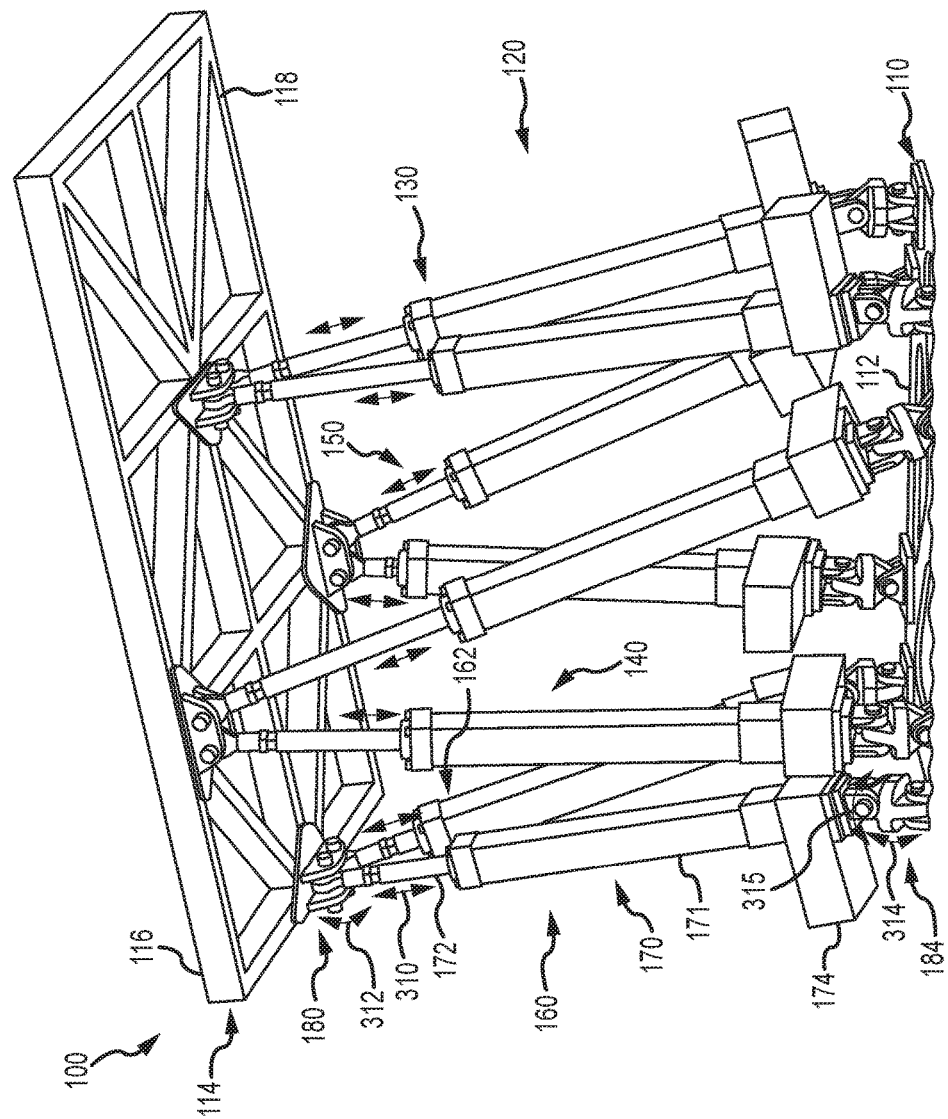
FIGS. 3-5 illustrate with three different views the motion platform system of FIGS. 1 and 2 during its controlled operation to move the motion platform to a new position through driving one to eight of the linear actuators in a complimentary manner.
Figure 4:
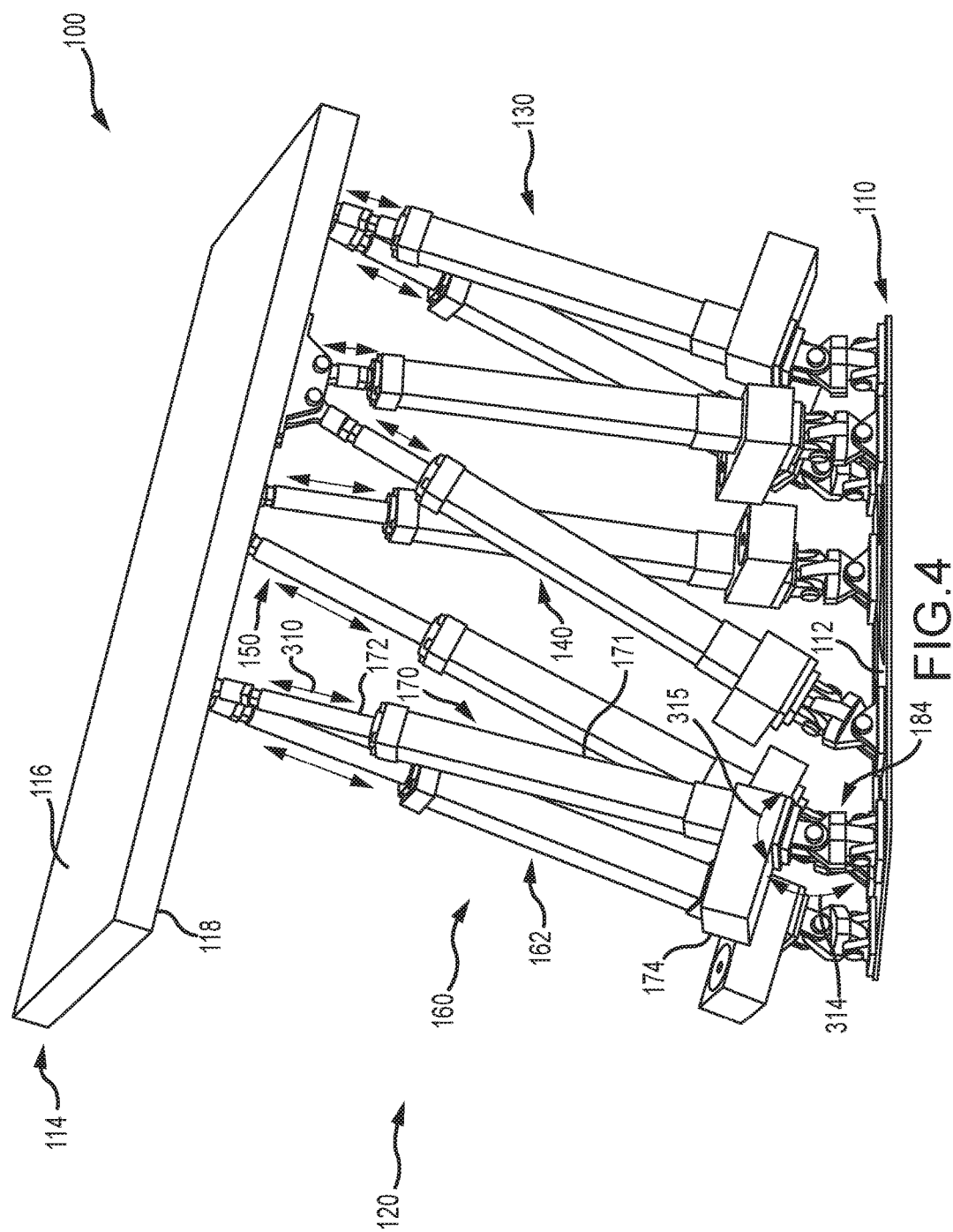
Figure 5:
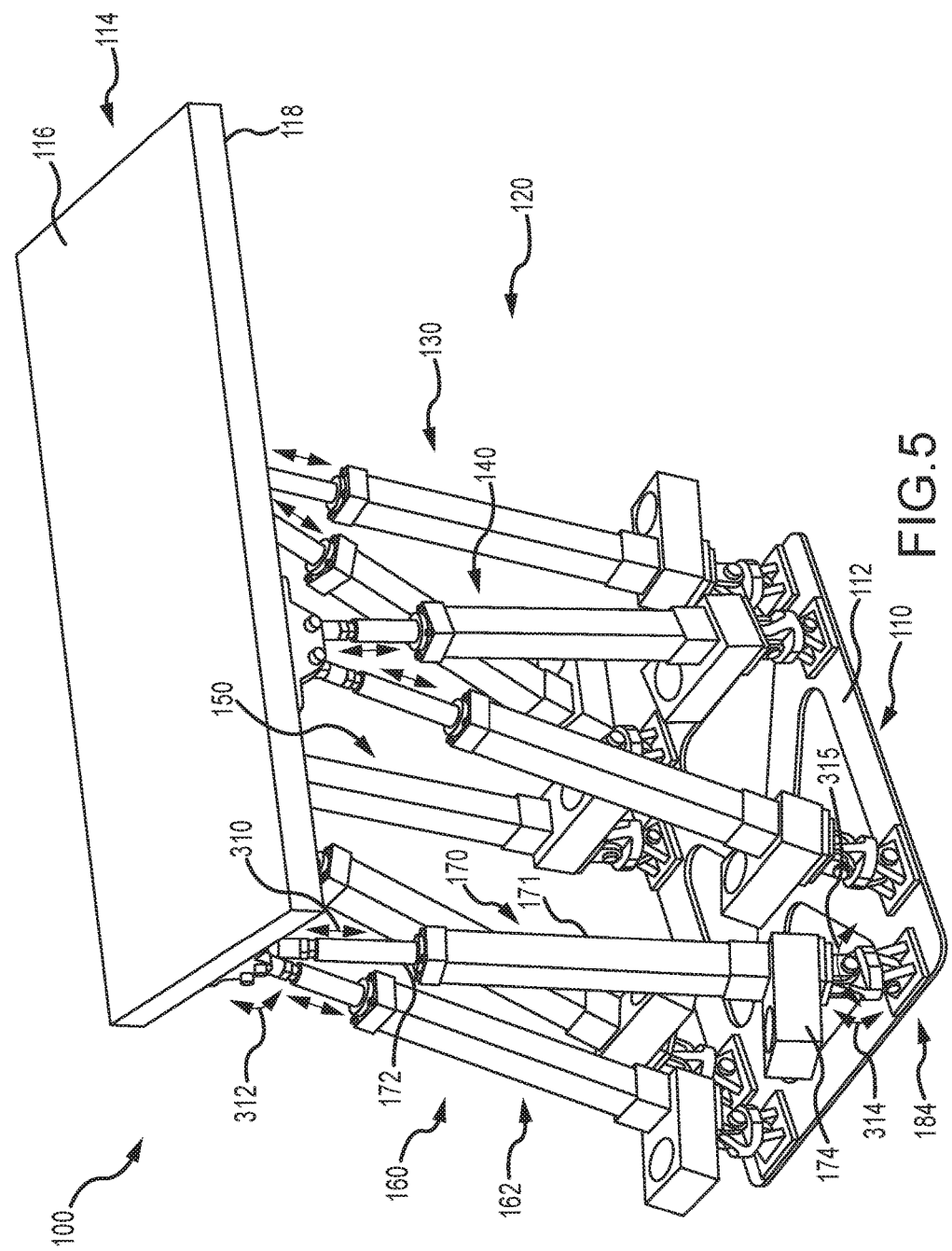

FIGS. 3-5 illustrate the motion platform system 100 as the platform 114 is being moved from the "at rest" position (or vehicle loading position) shown in FIGS. 1 and 2 to a new or second position, and this position has been chosen to illustrate that all six degrees of freedom of motion are used to place the platform 114 in this position. Arrows are shown near to each of the linear actuators in the actuator assemblies 130, 140, 150, and 160 of the actuation system 120 to show that each may be driven (independently and, in many cases, concurrently as a whole set or as a subset of less than all 8 actuators) through a linear stroke to drive movement of the four connection points between the actuators and the lower surface 118 of the motion platform 114 so as to provide six degrees of motion to the platform 114.

With reference to linear actuator 170, linear movement of the actuator rod 172 is shown with arrow 310. The pivotal connection of the ends of the actuator 170 allows rotation as shown at arrow 312 via the spherical rod end connector 180 at the upper end of the actuator 170 and further allows rotational movement as shown with arrows 314 and 315 via the U-joint connector 184 at the lower end of the actuator 170. Generally, the actuator assemblies 130, 140, 150, and 160 are controlled in a manner such that the actuators move in a complimentary manner to provide a desired movement of the platform 114.

Figure 6:
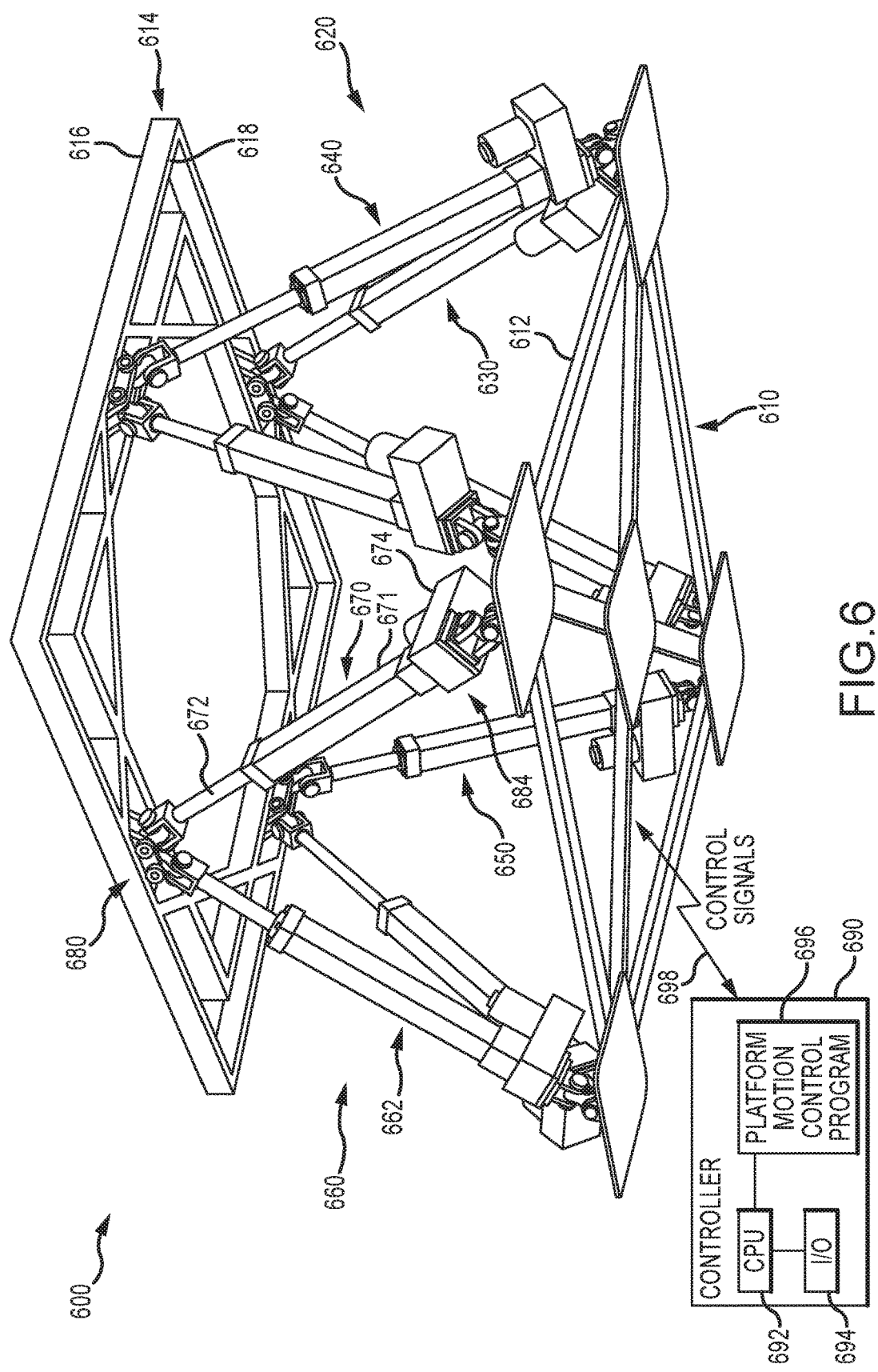
FIGS. 6 and 7 illustrate, with a bottom perspective view and a top perspective view, another embodiment of a motion platform system similar to the system of FIGS. 1-5 but with pivotal coupling provided at both ends of the actuators using U-joints to provide fuller rotation at the connection to the motion platform.
Figure 7:
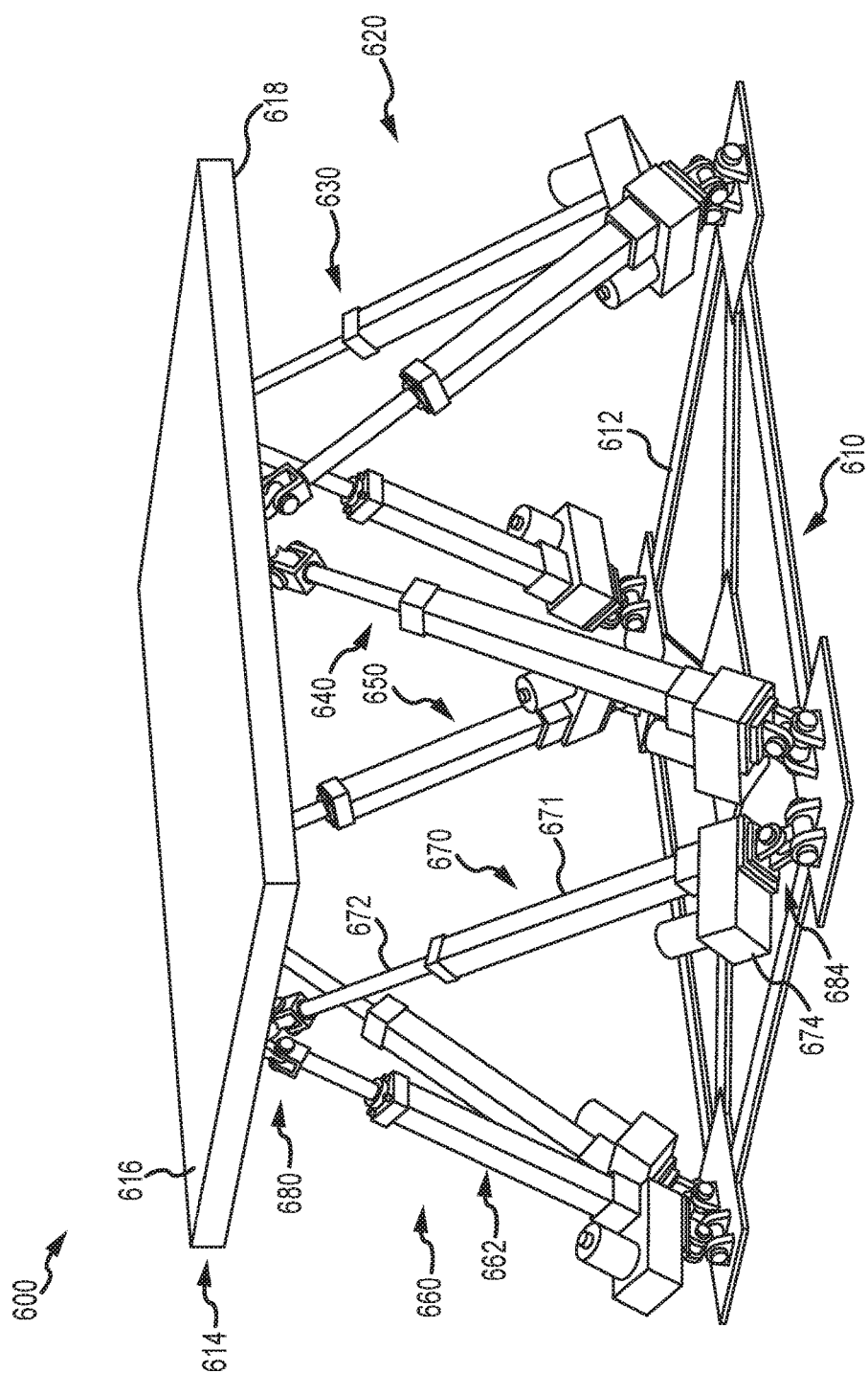

FIGS. 6 and 7 illustrate, with a bottom perspective view and a top perspective view, another embodiment of a motion platform system 600 similar to the system of FIGS. 1-5 but with pivotal coupling provided at both ends of the actuators using U-joints to provide fuller rotation at the connection to the motion platform. As shown, the system 600 includes a base 610 with an upper surface 612 and an upper plate or motion platform 614 with an upper (mounting, in some cases) surface 616 and a lower surface 618. An actuation system 620 is disposed between these two components 610 and 614.

Particularly, the actuation system 620 includes four actuator assemblies (or linear actuator pairs) 630, 640, 650, and 660. As shown for actuator assembly 660, each pair or assembly includes first and second actuators 662, 670, which are each pivotally coupled at a first or lower end to the upper surface 612 of the base 610 and at a second or upper end to the lower surface 618 of the motion platform 614. The first or lower ends of the two actuators in each pair or assembly are spaced apart (e.g., to form a first side or base of a triangle) on the base 610 while the second or upper ends of the paired actuators are linked to a single platform coupling component (e.g., such that the actuators form the second and third sides of a triangle as shown).

Each of the actuators has a similar design such that each will be understood based on discussion of the actuator 670 of the actuator assembly 660. The linear actuator 670 includes an elongated body or housing 671 in which an elongated shaft or rod (or actuator rod) 672 is supported and disposed. The actuator 670 includes a driver 674, e.g., an electric motor-based driver, which is operable to cause the actuator rod 672 to move through a linear drive stroke of a predefined length that results in the rod 672 being wholly or partially withdrawn into the body 670 and wholly or partially extended outward from the body 670 as the linear actuator is free to pivot at each of its ends (coupled to platform 614 on one end with platform coupling element 680 and to base 610 at the other, opposite end with base coupling element 684, which may be or include U-joints as shown in FIGS. 6 and 7). This drives movement of the platform 614 via the connections with the stationary base 610 (e.g., the base 610 may be rigidly coupled to a floor or other support structure) and the unrestrained platform 614.

In this regard, the system 600 includes a controller 690 that is operable to generate control signals 698 that are transmitted in a wired or wireless manner to the driver 674 to cause the driver 674 to move (or not move) the rod 672 at a particular rate and with a particular magnitude (amount of the stroke to perform at a desired speed). To this end, the controller 690 may include one or more processors 692 executing code or instructions (in a computer readable medium such as in memory of controller 690 not shown) to provide the functionality of a platform motion control program or module 696. The program 696 may be designed to position, with 6 DOF movement through independent and concurrent/coordinated operation of the drives of each of the eight linear actuators with control signals 698, the motion platform 614 in a series of orientations or positions over a time period (e.g., to provide a flight simulation or other ride experience when the platform 614 is used to support a ride vehicle). In other cases, a user or operator may interact with input/output device 694 (e.g., a joystick, a touchscreen, a keyboard, a mouse, and so on), and the program 696 may process these inputs to generate the control signals 698 to move the platform 614 based on this user/operator inputs.

To facilitate movement to these various platform positions using six DOF motions, the linear actuator 670 is coupled at a lower end to the base via a U-joint connector 684 and is also coupled at an upper end to the base 614 via a U-joint connector 680. In this manner, both ends of the linear actuator 670 are able to move with a fuller pivotal range of motion or with rotation (as compared to use of a connector such as a spherical rod end).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Previous attempts at solutions to the problems associated with use of Stewart platforms have involved secondary actuators or additional mechanical or structural support while still retaining the standard triangular, six actuator configuration. These solutions are relatively complex and do not completely eliminate non-redundant load path components. In contrast, the systems taught herein are simpler and safer to design, fabricate, and maintain. When engineering and maintenance costs are considered, the new systems are considerably less expensive. The new systems also have the potential for increased load capacity and greater travel (e.g., a larger travel envelop for the motion platform even with the same sized linear actuators (or with same stroke lengths)) due to the rectangular truss configuration versus triangular truss configuration. The motion platform system is also better suited to common load base shapes.

Further, although the examples in the figures showed use of linear actuator as the means of movement, other embodiments envisioned by the inventor include use of rotary actuators or gear motors with lever arms on the output shaft with fixed length rods. In other embodiments, spherical rod ends or U-joints are used to create the desired motion. The use of eight motion providers or actuators is not limited to use in modifying or recreating conventional Stewart platform configurations. For example, many motion simulators may be modified to include the eight actuator/motion provider arrangements described herein such as the motion simulators provided by CKAS Mechatronics PTY Ltd that utilize a hybrid-type Stewart platform.

Additionally, it should be noted that the spacing of the ends of the actuator pairs preferably will be the same for all four pairs of actuators. The two sets of pairs across from each other should be aligned such that a line connecting each pair is perpendicular with a line connecting the other two, much like an X and Y-axis on a plane. However, the distance between the actuator pairs on the X-axis versus the Y-axis can be equal or unequal. Further, it should be understood that in an elevation view the actuator pairs do not necessarily have to form a triangle or perfect triangle (e.g., as it is actually difficult to do so because the actuators would have to share the same connection pin), and, with this in mind, the pairs can and most often do form a trapezoid (or the "triangular pattern" is formed with one "corner" (e.g., the upper most one) comprising a component supporting both connection pins of the two side actuators).

In some embodiments, pairs of actuators (which may total 8, 10, 12, and so on) may be added to the assembly in a rectangular, pentagonal, hexagonal, or other shaped arrangement to achieve non-redundant load paths. The drawbacks, though, include increased complexity of the control system and increased cost due to additional actuators. In the same or other embodiments, the rectangular truss arrangement of 4 pairs of actuators may be modified so as to intentionally remove any one actuator to achieve a 7 actuator system that is still stable and functional. Such a design principle or modification of the examples illustrated in the figures expands to 9, 11, and so on actuators as will be understood by those skilled in the art.

I claim:

1. A motion platform apparatus for supporting an object and for moving the supported object with six degree of freedom (DOF) motion, the apparatus comprising:
   a motion platform;
   a base with an upper surface facing and spaced apart from a lower surface of the motion platform; and
   an actuation system coupled with the lower surface of the motion platform and with the upper surface of the base, wherein the actuation system operates to move the motion platform with six DOF motion, wherein the actuation system is free of non-redundant load paths, wherein the actuation system is pivotally coupled, via four platform coupling components, with the lower surface of the motion platform at four coupling locations that are arranged in a rectangular pattern, and wherein the actuation system comprises four actuator assemblies that are independently and concurrently operable to provide the six DOF motion.

2. The apparatus of claim 1, wherein the platform coupling components each comprises at least one U-joint.

3. The apparatus of claim 1, wherein each of the four actuator assemblies comprises a pair of linear actuators, each of the linear actuators being independently operable to extend or withdraw an actuator rod from an actuator body to move the motion platform.

4. The apparatus of claim 3, wherein each of the linear actuators is pivotally coupled at a first end to the upper surface of the base and at a second end to the lower surface of the motion platform.

5. The apparatus of claim 4, wherein the linear actuators in each of the pairs of linear actuators are arranged in a triangular or trapezoidal pattern with the first ends of the linear actuators in each of the pairs of linear actuators being spaced apart a predefined distance to define a first leg of the triangular or trapezoidal pattern and the second ends of the linear actuators in each of the pairs of linear actuators being pivotally coupled to a platform coupling component attached to the lower surface of the motion platform, whereby the linear actuators in each of the pairs of linear actuators define second and third legs of the triangular or trapezoidal pattern.

6. The apparatus of claim 5, wherein the platform coupling components define four coupling locations and wherein the four coupling locations are spaced apart in a rectangular pattern.

7. An amusement park ride, comprising:

a motion platform;

a passenger vehicle mounted on or integrally formed with an upper surface of the motion platform;

a base with an upper surface spaced apart from a lower surface of the motion platform; and an actuation system coupled with the lower surface of the motion platform and with the upper surface of the base, wherein the actuation system operates to move the motion platform with six DOF motion, wherein the actuation system is pivotally coupled with the lower surface of the motion platform at four coupling locations that are arranged in a rectangular pattern, wherein the actuation system comprises four actuator assemblies that are operable to provide the six DOF motion to the motion platform, and wherein the actuation system is free of non-redundant load paths.

8. The amusement park ride of claim 7, wherein each of the four actuator assemblies comprises a pair of linear actuators, each of the linear actuators being independently operable to extend or withdraw an actuator rod from an actuator body.

9. The amusement park ride of claim 8, wherein each of the linear actuators is pivotally coupled at a first end to the upper surface of the base and at a second end to the lower surface of the motion platform.

10. The amusement park ride of claim 9, wherein the linear actuators in each of the pairs of linear actuators are arranged in a triangular or trapezoidal pattern with the first ends of the linear actuators in each of the pairs of linear actuators being spaced apart a predefined distance to define a first leg of the triangular or trapezoidal pattern and the second ends of the linear actuators in each of the pairs of linear actuators being pivotally coupled to a platform coupling component attached to the lower surface of the motion platform, whereby the linear actuators in each of the pairs of linear actuators define second and third legs of the triangular or trapezoidal pattern.

\* \* \* \* \*